June 18, 1963 S. B. WELCH 3,094,605
OVEN TEMPERATURE CONTROL SYSTEM
Filed Feb. 28, 1962 2 Sheets-Sheet 1

*INVENTOR.*
STANLEY B. WELCH
BY Richard L. Caslin
HIS ATTORNEY

June 18, 1963  S. B. WELCH  3,094,605

OVEN TEMPERATURE CONTROL SYSTEM

Filed Feb. 28, 1962  2 Sheets-Sheet 2

INVENTOR.
STANLEY B. WELCH
BY Richard L. Caslin
HIS ATTORNEY

_United States Patent Office_ 3,094,605
Patented June 18, 1963

3,094,605
OVEN TEMPERATURE CONTROL SYSTEM
Stanley B. Welch, Louisville, Ky., assignor to General
Electric Company, a corporation of New York
Filed Feb. 28, 1962, Ser. No. 176,300
3 Claims. (Cl. 219—20)

This invention relates to a temperature controlling system and particularly to an electrical thermostatic control system having a single manual control means for obtaining a normal range of temperatures and a separate manual control means for shifting the point of control from the normal range of temperatures to a materially higher temperature range.

There is no known reason why the use of this invention should be limited to domestic ovens for use in cooking, although the invention has found its greatest utility in controlling a high temperature oven where the oven is operated at either normal cooking temperatures between about 150° F. and 600° F. or at higher temperatures between about 750° F. and 950° F. for burning off the food soil and grease spatter that accumulates on the walls of the oven liner while food is being cooked within the oven.

One example of such an oven provided with means for attaining a normal temperature range and a high temperature automatic heat cleaning oven is described and claimed in the co-pending application of Bohdan Hurko, Serial No. 27,926, which was filed on May 9, 1960, and is assigned to the General Electric Company, assignee of the present invention.

Hydraulic thermostats, having an elongated bulb or probe formed on one end of an elongated capillary tube that is joined at its opposite end to a bellows or diaphragm within the thermostat housing, have been widely used as oven temperature controlling thermostats for many years. One example of a suitable hydraulic type thermostat is disclosed in the United States patent to W. J. Ettinger No. 2,260,014, dated October 21, 1941. The normal oven cooking temperatures have been between about 150° F. and a maximum of about 600° F., and the thermally-responsive fluid used in hydraulic control systems has been able to withstand this degree of temperature without difficulty. However, the known thermally-responsive fluids cannot be operated at temperatures much above 600° F., which renders the hydraulic systems unsatisfactory for use in a high temperature oven unless provisions are made for protecting the thermostat bulb from being exposed to temperatures above 600° F. by suitable metal shields, air curtains, or similar means.

This invention contemplates the provision of an electrical thermostatic control system of the type having a variable-resistance temperature senser of the type that is quite widely used today for the automatic temperature control of surface heating elements of electric ranges. A thermostatic system of this general type is disclosed in the United States patent to Harry I. Baker 2,962,575, which issued on November 29, 1960. Such an electrical thermostatic system as disclosed in the Baker patent is, of course, quite satisfactory for use as an oven thermostat for normal cooking temperatures, but none have been commercially available at a reasonable price that would reach up into the contemplated heat cleaning temperatures between 750° F. and 950° F. and still have the necessary degree of accuracy from the minimum to the maximum temperatures.

The principal object of the present invention is to provide an accurate and reliable electric thermostatic control system using standard parts that are readily available on the market for controlling normal low temperature operations in one phase of the system and for controlling high temperature operations in a second phase of the system.

A further object of the present invention is to provide an electric thermostatic control system of the class described for a domestic oven where the high temperature heat cleaning operation of the system serves to burn off the food soil that is lodged on the inner surfaces of the oven liner, and where the control system is completely deenergized when the heat cleaning cycle is completed.

A still further object of the present invention is to provide an electric thermostatic control system of the class described with one manual control means for setting the desired temperature during the normal cooking operations and a separate manual control means for initiating the high temperature heat cleaning cycle so as to prevent inadvertent operation of the control system into a heat cleaning cycle.

The present invention, in accordance with one form thereof, embodies an electrical thermostatic control system that is adapted to be connected to a source of low voltage, a variable-resistance temperature senser for sensing the temperature of a body or an enclosure by virtue of being in heat transfer relation therewith, and a manually-settable thermostat that includes a voltage regulating relay so that the senser varies the effective output voltage of the relay in accordance with the sensed temperature regardless of variations in the line voltage. The thermostat also includes a first responder relay that receives the effective output voltage of the voltage regulator. A power relay is controlled by the first responder relay, and this power relay serves as the control means for a source of heat energy such as metal sheathed resistance heating elements. This first responder relay is utilized only for controlling normal cooking temperatures presettable for example between about 150° F. and 600° F. and to maintain the selected temperature. When it is desired to shift the control point of the circuit, a set-up switch means separate from the manually-settable thermostat is used to disconnect the first responder relay from the transformer and to energize a set-up relay means that will complete a circuit to a second responder relay that serves to govern the power relay within the high temperature heat cleaning range. Once the temperature reaches the predetermined maximum temperature the second responder relay will be de-energized thereby de-energizing the set-up relay means and finally de-energizing both the control circuit and the power circuit. The set-up switch is used to activate the heat cleaning cycle with a momentary contact action, and it may also be positioned to close a circuit through the first responder relay during the normal cooking operations.

The thermostatic control system of this invention is of primary importance when used in a domestic oven having an automatic high temperature heat cleaning cycle for burning off the food soil from the walls of the oven liner. In this application, suitable interlock switches are combined with the oven door to insure that the high temperature heat cleaning cycle cannot be initiated unless and until the oven door is locked. A further precaution is to insure that the oven door cannot be opened while the oven temperature remains above a safe temperature for opening the door.

My invention will be better understood from the following description taken in conjunction with the accompanying drawings and its scope will be pointed out in the appended claims.

Figure 3:
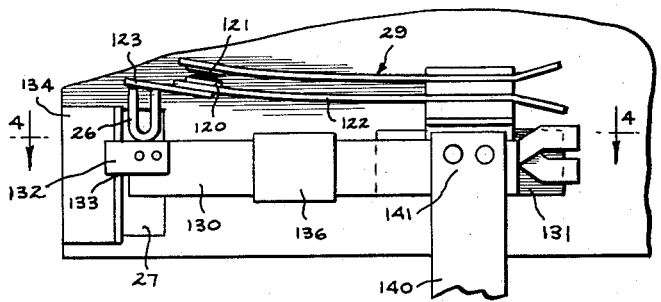
FIGURE 3 is a detailed elevational view of the door latch interlock switch of the present invention taken on the line 3—3 of FIGURE 2.
Figure 4:
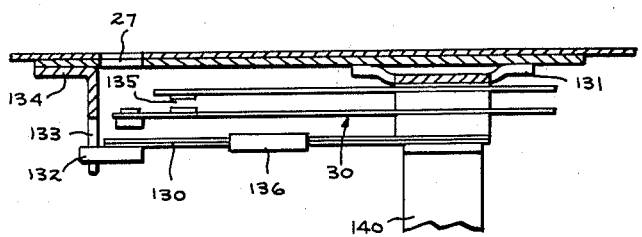
Figure 5:
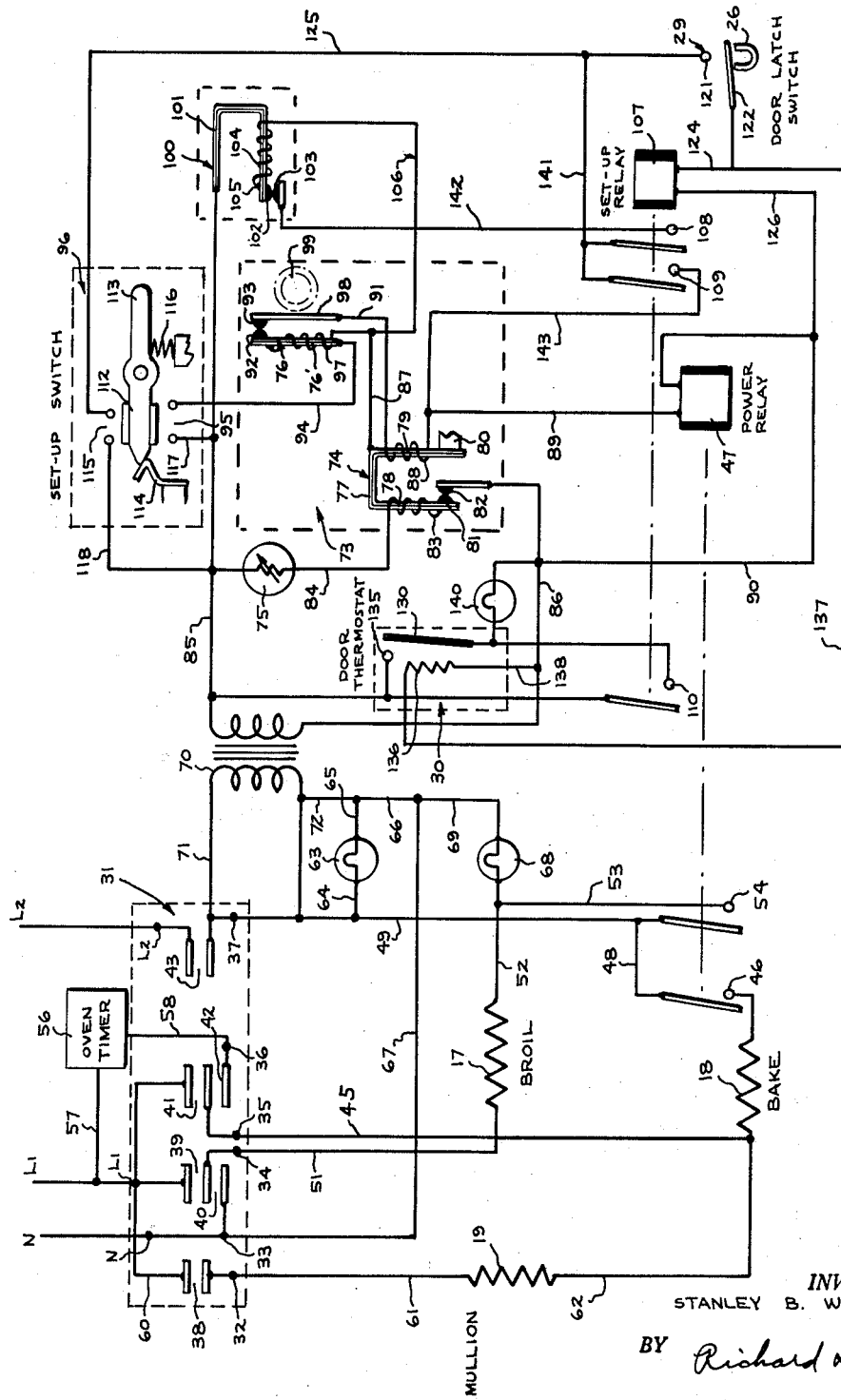

FIGURE 4 is a detailed plan view of a door thermostat which cooperates with the oven door latch mechanism so that the latch mechanism may not be opened if the oven temperature is above a safe temperature for opening the door, and this view is taken on the line 4—4 of FIGURE 3; and FIGURE 5 is a schematic representation of both the control and power circuitry embodying the principles of the present invention.

Figure 1:
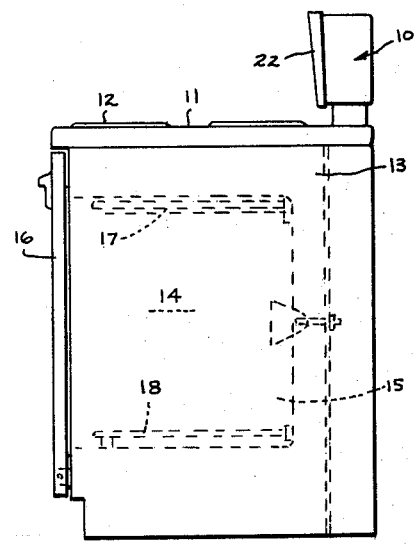
FIGURE 1 is a right side elevational view of a free-standing electric range embodying the thermostatic control system of the present invention.

Turning now to a consideration of the drawings and in particular to FIGURE 1, there is shown an electric range 10 having a top cooking surface 11, with a plurality of surface heating elements 12. The cooking surface 11 is supported on a range body or cabinet structure 13 in which is built an oven 14 that is formed by a box-like oven liner 15, and a front-opening drop door 16. A source of heat energy must be provided for the oven 14 and it is represented by standard resistance heating elements 17 and 18 within the oven which elements preferably will be of the metal sheathed type. Heating element 17 is a broil unit arranged adjacent the top wall of the oven liner, while the other heating element 18 is a baking unit supported near the bottom wall of the oven liner. Both of these heating elements 17 and 18 are supported from the back wall of the oven liner 15 and they are connected to lead wires that connect with a source of voltage as will be well understood by those skilled in this art.

Figure 2:
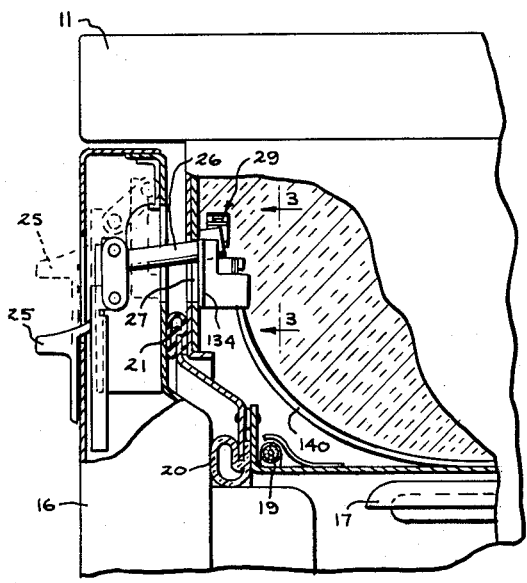
FIGURE 2 is an enlarged fragmentary side view of the front right side of the oven of FIGURE 1 with parts broken away to show an oven door latching mechanism that is usable with the present invention.

It has also been found expedient in a heat cleaning oven to add a third resistance heating element in the form of a mullion heater 19, best shown in FIGURE 2, in the vicinity of the door opening to compensate for heat lost through and around the door 16 as described and claimed in the aforementioned Hurko application. This mullion heater 19 may be a metal-sheathed heating element of a construction similar to elements 17 and 18. It encircles the front opening or collar of the oven liner 15. While the mullion heater is shown as being located externally of the oven liner, it should be appreciated by those skilled in this art that it could be assembled within the throat of the oven liner with a suitable trim member or guard placed thereover.

FIGURE 2 also shows a pair of door gaskets 20 and 21 which encircle the door opening and are sandwiched between the range body 13 and the oven door 16 when the door is closed. The innermost gasket 20 is a woven asbestos member of tubular form, while the other gasket 24 is an extruded silicon rubber gasket as described and claimed in the aforementioned Hurko application. Lastly, the necessary manual controls (not shown) for both the surface heating elements 12 and the oven heating elements 17, 18, and 19 are located in the face of the control panel of the backsplasher 22 which is positioned along the back edge of the cooking surface 11 in a raised position for ready observation and manipulation of the controls is well understood in this art.

Before turning to a discussion of the circuit diagram of FIGURE 5, mention will be made of the fact that the oven door 16 is adapted to be locked in the closed position to insure that the oven cannot be opened when the oven air temperature is above the normal cooking temperatures. Looking at FIGURE 2, the door 16 is shown with a handle 25 which is different from the usual door handle in that it is not a stationary member but is movable in a linear direction along the front face of the door between the full line position to the dotted line position identified as 25′. Since the present invention does not necessitate a specific door latch mechanism, this mechanism is only shown diagrammatically and described briefly. The latch mechanism as depicted in the drawings is patterned after the mechanism in a co-pending application of George A. Scott and Milton S. Williams, Jr., Serial No. 81,371, which is also assigned to the General Electric Company, the assignee of the present invention.

It is thought sufficient to mention the following features of the door latch. The door latch mechanism is mounted within the interior of the oven door 16. One and and preferably two vertically swingable latch members 26 are mounted adjacent slots on the inner side of the door so that when the door handle 25 is depressed the latch members will swing outwardly and engage within a slotted opening or keeper portion 27 in the front of the range body 13. As the handle approaches its fully locked position, the latch members 26 are adapted to pull backwardly into the door thereby closing the door 16 tightly against the door gaskets 20 and 21 to provide a dependable sealing means for the door opening.

Cooperating with the latch members 26 is a door latch interlock switch 29, best shown in FIGURE 3, that serves as a door interlock means when the oven is to be started on its high temperature heat cleaning cycle so that the cycle cannot begin unless the door is closed and locked shut. A more detailed description of the function of the door latch switch 29 will be given later during the explanation of the circuit diagram of FIGURE 5. It is felt best to mention here that cooperating with the door latch switch 29 is a door thermostat 30 shown in FIGURE 4 whose principal purpose is to prevent the latch member 26 from being unlatched when the oven air temperature is above the normal cooking temperatures of about 600° F. so that the housewife must wait until the temperature has cooled down before the oven door 16 may be opened. The details of the structure of this door thermostat 30 will also be discussed later with reference to the circuit diagram of FIGURE 5.

The description given above is explained for purposes of back ground information that will facilitate an understanding of the present invention which will now be described. My invention is concerned with an electrical system for controlling the temperature within the oven cavity 14. The principles of operation can best be understood with reference to the circuit diagram of FIGURE 5, wherein the three resistance heating elements 17, 18 and 19 are shown connected in a power circuit that is supplied from the usual single phase, 236 volt, alternating current, three-wire Edison service entrance that is commonly found in an adequately-wired residence. The three power supply wires are identified as line wires L1 and L2 and the neutral wire N; it being understood that there is an electrical potential of 236 volts across lines L1 and L2 and 118 volts across either lines L1 or L2 and the neutral wire N. These voltages are expressed as definite numbers, but it is well to remember that there is a wide variation in the supply of voltages not only in various parts of the country but in various parts of the same city that is supplied power from the same electric company. Accordingly, variations in the voltage having a nominal value of 236 volts may extend from about 200 volts to about 260 volts.

An oven selector switch 31 is interposed between the source of voltage and the heating elements in order to be able to vary the several circuit combinations which are available. The oven selector switch 31 has three line terminals identified as N, L1 and L2 to conform to the identifications of the supply wires bringing current to the switch. The selector switch 31 also has a series of load terminals identified as elements 32–37 inclusive. Finally, the selector switch 31 includes a plurality of cooperating electrical contact means 38–43 inclusive which are switched in and out of the different circuits for varying the circuitry of the heating elements.

During a baking operation, the bake unit 18 is connected across lines L1 and L2 at 236 volts, while the broil unit 17 is operated at 118 volts across line L2 and neutral wire N. The circuit for the bake unit 18 is from line L1 through line terminal L1, closed switch contact 41, load terminal 35, through lead 45, to bake unit 18, and then through a lead to the closed contacts 46 of a single-throw double-pole power relay 47 of the control circuit which will be explained in detail hereinafter. From the relay contacts 46, the circuit is through leads 48 and 49 to load terminal 37, and through closed switch contact 43 to line terminal L2, and then line L2.

The circuit for the broil unit 17 during a baking operation is from neutral wire N across line L2, and this circuit may be traced from neutral wire N, through line terminal N, through closed switch contacts 40 to load terminal 34, through lead 51 to broil unit 17, and then through leads 52 and 53 to the second set of switch contacts 54 of the power relay 47, and then through lead 49 to the load terminal 37, and then through closed switch contacts 43 to line terminal L2 and line L2.

When a broiling operation is performed only the broil unit 17 is energized and it is connected across lines L1 and L2 at 236 volts. Its circuit may be traced from line L1, line terminal L1, closed switch contacts 39, through lead 51 to broil unit 17, and then back to line L2 by means of leads 52 and 53, through power relay contact 54, and then through lead 49 to load terminal 37, and then through closed switch contacts 43 to line terminal L2, and then line L2.

When it is desired to operate a timed baking cycle only the bake unit 18 is energized and it is connected across lines L1 and L2 so as to operate at 236 volts. An oven timer 56 is interposed between line L1 and the lead 45 of the bake unit 18 so as to bypass the switch contacts 41 and the oven timer may control the timed baking circuit. The timer 56 is connected by lead 57 to line terminal L1, and by lead 58 to switch contacts 42. Otherwise the circuit for the bake unit 18 is the same as it was during the regular baking operation explained above.

Finally, the heat cleaning cycle places the bake unit 18 in series with the mullion heater 19 across lines L1 and L2 at 236 volts. This circuit may be traced from line L1, through line terminal L1 and switch conductor 60 to closed switch contacts 38, to load terminal 32, thence through lead 61 to mullion heater 19, and then from the mullion heater through lead 62 to the bake unit 18, and then the circuit returns to line L2 through power relay contacts 46, lead 48, lead 49 to load terminal 37, through closed switch contacts 43 to line terminal L2, and then line L2.

It is deemed desirable to have an oven indicator light 63 that is energized whenever the selector switch 31 is operated to an ON position. This oven indicator light 63 is connected across line L2 and neutral wire N by lead 64 connected to lead 49 that is joined to the load terminal 37, while the lamp 63 is connected to the neutral wire N by leads 65–67, where the lead 67 is connected to the load terminal 33 of the switch. It will be understood by those skilled in this art that in practice the switch 31 would not include both terminals N and 33 but only one terminal which serves for both.

It is also well to provide the oven with an oven pilot light 68 which is connected in the circuit so that it is energized only when the heating elements 17, 18 and 19 are energized so that when the power relay cycles OFF by opening the relay contacts 46 and 54 the oven pilot light 68 will also be extinguished thereby indicating that the oven temperature has reached the desired temperature that has been set by the oven thermostat as will be explained hereinafter. This oven pilot light 68 is connected by lead 53 to the relay contacts 54 and by lead 69 back to neutral through lead 67 that is connected to load terminal 33.

The control circuit disclosed in FIGURE 5 comprises a stepdown transformer 70 that has its primary winding connected to the power supply across line L2 and neutral wire N for providing at the secondary winding a voltage of about 12 volts. The primary of the transformer has one lead 71 joined to load terminal 37, it being understood that whenever the selector switch 31 is operated to an ON position the switch contacts 43 are closed. Another lead 72 of the primary of the transformer is connected to ground through leads 66 and 67 back to load terminal 33 and neutral wire N. A main component of the present invention is an electric thermostat 73, which is blocked out in dotted lines, of the basic type taught in the Baker Patent No. 2,962,575, as was mentioned previously. This type of thermostat has a pulsing thermal relay or voltage regulator 74 that is controlled by a variable-resistance senser 75 and which in turn controls a responder relay 76 that governs the operation of the power relay 47. The senser 75 is preferably a resistor having a high temperature coefficient of resistance, and it is adapted to be located within the oven cavity 14 to detect the oven air temperature therein.

The line voltage of the three-wire source of electrical energy is subject to variations at different periods of time. Accordingly, one of the main functions of the pulsing thermal relay 74 is to free the circuit from being voltage sensitive so as to prevent such variations of line voltage from adversely affecting the consistency of operation of the equipment. The voltage regulating relay or voltage regulator 74 is formed as a U-shaped bi-metallic or polymetallic blade 77 having a pair of leg portions 78 and 79 that lie substantially in a common plane and extend in spaced parallelism with one another in that plane. One end of leg 79 is fixed as at 80, but it is not to be construed as a grounding connection. The distal end of the opposite leg 78 is provided with an electrical contact 81 which is normally engaged with a fixed electrical contact 82. Differential heating of leg portions 78 and 79 is accomplished by heating means in the form of a heater winding 83 coiled around leg portion 78 and electrically connected at one end to this leg. The other end of the winding 83 is series connected with the senser 75 by lead 84. The other side of the senser 75 is connected to the secondary of the transformer by lead 85. The voltage regulator contacts 81 and 82 are connected back to the secondary of the transformer by the lead 86.

The bimetal blade 77 of the voltage regulator 74 is formed of U-shape to permit compensation of ambient temperature variations since the effect upon the position of movable contact 81 upon the heating of leg portion 78 is opposite that produced by the heating of leg portion 79. Each time the contacts 81 and 82 of the voltage regulator are closed the current flows through the heater winding 83 and through the senser 75. The resultant heating of leg portion 78 causes the contact-carrying end of the leg portion to deflect in a direction to separate contact 81 from contact 82. When these contacts are separated, the energizing circuit for heater winding 83 is interrupted and leg portion 78 commences to cool thereby deflecting in the direction to return contact 81 into re-engagement with contact 82 so as to re-establish the circuit. Leg portion 78 continues to cycle in alternate directions with a small-amplitude motion thereby tending to maintain the effective wattage input to heater winding 83 constant for any given resistance of senser 44. Accordingly, the heater winding 83 will receive energy as a series of pulsations the average or effective voltage of which does not vary as variations occur in a magnitude of the source of voltage. Since the resistance of heater winding 83 is fixed, the effective current through the heater winding and hence through senser 75 will also not vary in magnitude with supply voltage variations. The output lead of voltage regulator 74 is lead 87 that is joined to the responser relay 76.

The effective voltage appearing across the transformer lead 85 and the regulator output lead 87 equals the sum of a fixed voltage drop across heater winding 83 and a variable voltage drop across senser 75. The voltage drop across the heater winding is determined by the product of the fixed effective current and of the fixed resistance of heater winding 83, while voltage drop across the sensor is determined by the product of a fixed current and a variable resistance of sensor 44. Therefore, the effective output voltage drop across the voltage regulator 73 appearing between output lead 87 and input lead 85 does not vary with changes in the voltage from the three-wire source of voltage, but does vary directly with the resistance of senser 75.

The voltage regulator 74 is also provided with an anticipator winding 88 which is coiled around the leg portion 79 but electrically insulated therefrom. The function of the anticipator winding is to prevent excessive overshoot of the temperature as it approaches the predetermined maximum temperature set by the thermostat 73 by reducing the power before the desired temperature is reached. The anticipator winding 88 is connected across the secondary of transformer in series with the power relay 47 by lead 89 and the power relay connected by lead 90 to lead 86 of the transformer. The other side of the anticipator winding 88 is connected by lead 91 to the normally closed contacts 92 and 93 of the first responder relay 76, and then by lead 94 to contacts 95 of a set-up switch 96 which contacts, when closed, are connected to the lead 85 of the secondary of the transformer.

An understanding of this circuit will be facilitated by the following description of the design of the first responder relay 76. This relay has a bimetallic blade 76' that may be of U-shape similar to bimetal member 77 of the voltage regulator 74. The purpose of the responder 76 is to integrate the pulsations of energy which are applied to it from the voltage regulator 74 so that it responds only to the effective value of the voltage between leads 85 and 87. A heater winding 97 is coiled around the blade 76' and connected at one end thereto. This blade 76' is connected to the secondary of the transformer through lead 94 and contacts 95 of a set-up switch 96 to transformer lead 85. The contact 93 of the responder relay 76 is mounted on the distal end of an adjustable blade 98 that is placed in juxtaposition to the bimetal member 76'. This adjustable blade 98 has its position determined by a manually adjustable cam member 99 which would be mounted on a shaft of the control handle for the electric thermostat 73. Moreover, the adjustable blade 98 includes a permanent magnet (not shown) as part of the contact 93 to provide a spread or differential between the effective voltage at which the contacts 92 and 93 are brought into engagement and the higher voltage at which these contacts are separated. This feature is of standard construction and is not further described here since it is clearly taught in the aforementioned Baker Patent 2,962,575. It should be understood at this point that the control circuit explained so far is sufficient for governing the heating elements 17 and 18 and 19 in the power circuit during a normal cooking operation between about 150° F. and 600° F. by appropriate adjustment of the cam 99. The selected temperature will be maintained rather closely by the functioning of the senser 75 whose effective resistance varies with temperature changes. As the temperature of the oven rises above and falls below the desired set temperature, the senser 75 functions to effect the operation of the responder relay 76 to in turn effect the operation of the power relay 47 to open and close the current flow to the heating elements 17 and 18 thereby to hold the selected temperature.

The following portion of the control circuit is needed in order to shift the control point of the electric thermostat 73 so as to be capable of raising the oven air temperature to a range between 750° F. and 950° F. for burning off the food soil and grease spatter that accumulates on the oven liner. The first added feature that is necessary is a second responder relay 100 having a heating element or coil which is capable of operating the oven in the temperature range between 600° F. and 950° F. for holding the control circuit closed until the oven air temperature reaches a predetermined maximum temperature at which time the second responder relay will open and completely de-energize the system. The second responder relay 100 has a U-shaped bimetal member 101 that is similar in construction to the bimetal member 77 of the voltage regulator 74. This second responder relay 100 has a pair of normally-closed contacts 102 and 103. Contact 102 is supported from the distal end of a movable leg of the bimetal 101, and this leg is provided with a heater winding 104 which is coiled therearound and connected at one end to the leg as at 105. One end of this heater winding is connected to the voltage regulator output by means of leads 106 and 87, while the other end of the heater winding 104 is connected to the transformer lead 85 by means of the bimetal member 101. While the contacts 102 and 103 of the second responder relay 100 are normally closed this does not mean that the second responder relay is energized at all times. The circuit through the second responder relay contacts is controlled by a relay means 107 which is a three-pole relay having sets of contacts 108, 109 and 110.

Before explaining the operation of the relay means 107 it is felt best to return to the set-up switch 96 and explain how it is capable of operating the relay means 107. The switch 96 is a single pole, three position switch where one position momentarily closes contacts 115, a central position is an OFF position, and a third position closes contacts 95 which when closed connects the first responder relay 76 to the transformer lead 85 so that the electric thermostat 73 may be adjusted by the cam member 99 for controlling the heating elements 17, 18, and 19 during normal cooking operations. The switch includes a bridging conductor 112 that is supported on a pivoted switch actuator 113. A spring biased detent member 114 cooperates with the switch actuator 113 to hold the bridging conductor 112 in the third position closing the circuit between contacts 95. The momentary switch action for contacts 115 is provided by a spring member 116 bearing against the switch actuator 113. Hence, when manual pressure holding the bridging conductor 112 against the momentary contacts 115 is released, the spring 116 will return the switch actuator 113 to the central position shown in FIGURE 5. The contacts 95 of the set-up switch 96 are connected to the transformer lead 85 by a lead 117, while the momentary contacts 115 of the same switch are connected to the transformer lead 85 by lead 118.

It is important to have an electrical interlock means between the control circuit and the oven door to insure that the heat cleaning cycle may not be initiated until and unless the oven door is closed and locked shut. This feature is provided by the door latch switch 29 of FIGURE 3 which is normally open but is closed by the locking of door latch member 26. This door latch switch 29 is best shown in FIGURE 3 as comprising contacts 120 and 121 where contact 120 is mounted on the distal end of the movable blade 122. This blade 122 is mounted in cantilever fashion and it has an insulating finger 123 which is engaged by the latch member 26 when the door is locked shut thereby pressing the movable blade 122 against the fixed contact 121. As best seen in FIGURE 5, this door latch switch 29 is connected in the circuit between the relay means 107 and the set-up switch 96 by means of leads 124 and 125 respectively. When the momentary contacts 115 of the set-up switch 96 are closed to initiate the heat cleaning cycle, current flows from the transformer 70, through the set-up switch 96, and then by means of lead 125 to the door latch switch 29, and then through the relay means 107 which is connected to the ground side of the transformer by means of leads 126, 90 and 86. Of course it will be understood that if this circuit were broken by opening contacts 120 and 121 of the door latch switch 29, the heat cleaning cycle could not be energized.

Another safety feature is a door thermostat 30 as seen in FIGURE 4 which is used to insure that once the oven air temperature has risen above the normal cooking temperatures of about 600° F., the door may not be unlatched even though the heat cleaning cycle might have been terminated and the power circuit de-energized. The door thermostat 30 includes a bimetallic blade 130 which is supported in cantilever fashion adjacent the latch member 26 of the oven door as is best seen in FIGURE 3. When this bimetallic blade 130 is exposed to a temperature in the vicinity of 600° F. or below, it is in a position where it does not interfere with the free-swinging movement of the latch member 26. However, when the oven temperature rises above this amount this blade tends to flex in a direction to move into a supporting or interfering position beneath the latch member 26 when the door is latched. The bimetal blade 130 is supported from a mounting bracket 131, and the free end of the blade is provided with an outwardly directed finger 132 which overlies a shelf 133 that is part of a bracket 134 that is fastened to the oven body 13. This shelf 133 assists in supporting the free end of the blade 130 if an attempt is made to unlock the latch member 26 when the oven is operating above the normal cooking temperatures. Combined with the bimetallic blade 130 of the door thermostat 30 is a set of normally open contacts 135 which is closed automatically when the bimetal blade 130 is flexed beneath the latch member 26. A heater member 136 is arranged adjacent or around the bimetal blade 130, and this heater is connected in the heat cleaning circuit between the door latch switch 29 and the ground side of the secondary of the transformer by means of leads 137 and 138, and 86 respectively.

There is always a considerable thermal lag or temperature differential between the bottom of the oven liner 15 and the top wall thereof where the door thermostat 30 is mounted. To offset this condition, the heater 136 has been added to the door thermostat. Moreover, a heat conductor or heat path 140, as best seen in FIGURE 2, in the form of a strip of aluminum is fastened at its upper end 141 to the mounting bracket 131 while its lower end is fastened to the top wall of the oven liner. This heat conductor 140 renders the bimetal blade 130 subject to the residual heat of the oven so that the thermal balance of the bimetal blade of the heat received from the oven liner and the heat dissipated from the bimetal is such that the thermal interlock or door thermostat remains in the latched position until the oven liner has again reached a safe level for opening the door. It should be understood that the feature of this thermal interlock or door thermostat is not part of the present invention, but it is claimed and more fully described in the co-pending application of George A. Scott, Serial No. 88,526, which was filed on February 10, 1961, and is assigned to the same assignee as is the present invention. Shunting the contacts 135 of the door thermostat 30 are the switch contacts 110 of the relay means 107 for the purpose of energizing a pilot light 140 which when illuminated denotes that the heat cleaning cycle is in progress. The reason for placing the door thermostat contacts 135 and the relay contacts 110 in parallel with each other is to insure that the pilot light 140 will be energized not only during the heat cleaning cycle but also during the time that the temperature within the oven cavity is above the normal cooking temperatures and it is not safe to unlock the door. Hence, the pilot light 140 will be energized from the beginning of the heat cleaning cycle until after the heat cleaning cycle has terminated and until the door thermostat opens when the bimetal blade 130 deflects out from under the door latch member 26 to signify to the housewife that the oven cavity may be entered by unlocking and opening the door.

The first set of contacts 108 of the relay means 107 is connected in series with the normally closed contacts 102 and 103 of the second responder relay 100 by means of lead 142, as well as being series connected to a second set of contacts 109 of the relay means 107. This second set of relay contacts 109 is joined to the power relay 47 by means of leads 143 and 89 which completes the description of the wiring diagram for the control circuit.

The operation of the heat cleaning cycle is a follows: first the oven door 16 must be closed and latched to close the door latch switch 29 before the heat cleaning cycle can be initiated. Then the oven selector switch 31 is set to a heat cleaning position which closes switch contacts 38 and 43 and prepares to join the mullion heater 19 in series with the bake unit 18 across lines L1 and L2 at 236 volts once the power relay 47 is energized. Simultaneously, the step-down transformer 70 will be energized. Finally, the cleaning cycle is initiated by momentarily closing switch contacts 115 of the set-up switch 96. By closing the momentary contacts 115, the other contacts 95 of the set-up switch are opened thereby disconnecting the circuit to the heater coil 97 of the first responder relay 76. The closing of the momentary contacts 115 completes the circuit to the relay means 107 for actuating the relay and closing the three sets of relay contacts 108, 109 and 110. The circuit through the relay means 107 is from the set-up switch 96 through lead 125, door latch switch 29, lead 124 to the relay means 107 and thence by leads 126, 90, and 86 to the return side of the transformer 70. The closing of relay contacts 108 establishes an alternate or holding circuit through the relay by means of the second responder relay 100 where the circuit may be traced from the transformer lead 85, through bimetal blade 101 of the second responder relay, through normally closed contacts 102 and 103 of the second responder relay, lead 142 to the relay contacts 108 and thence by a lead 141 and 125 to the door latch switch 29 to the relay means 107 and thence back to the ground side of the transformer 70.

Simultaneously with the closing of the relay means 107, the door thermostat heater 136 is energized for building up heat that will cause the bimetal blade 130 of the door thermostat to slip under the latch member 26 when the oven temperature rises above the normal cooking temperatures. Since the heater 97 of the first responder relay is de-energized by the set-up switch 96 when the heat cleaning cycle is initiated, the first responder relay no longer controls the actuation of the power relay 47. Instead of this the second responder relay 100 acting by means of leads 142, 143 and 89 through the second set of relay contacts 109 energizes the power relay 47 which closes the power relay contacts 46 and 54 for energizing the bake unit 18 and mullion heater 19. Although the heater 97 of the first responder relay is de-energized, the contacts 92 and 93 of the first responder relay will cycle when the oven temperature is above the setting of the thermostat knob 99 of the electric thermostat 73 so as to protect the first responder relay against overheating. As the heat cleaning cycle progresses, the interlock heater 136 will cause the bimetal blade 130 to underlie the door latch member 26 thereby closing the door thermostat contacts 135. Eventually, the oven air temperature will reach the predetermined maximum temperature of somewhere between approximately 750° F. and 950° F. at which temperature the second responder relay contacts will open. This de-energizes the relay means 107 which in turn de-energizes the power relay 47 and interlock heater 136. The only element that remains energized is the pilot light 140 which receives current through the door thermostat contacts 135 as long as the oven temperature is above a predetermined safe temperature for opening the door.

Modifications of this invention will occur to those skilled in this art and it is to be understood, therefore,

What I claim as new and desire to secure by Letters Patent of the United States is:

1. An electric oven comprising an oven cavity, electric heating elements in heat transmitting relation to the oven cavity and adapted for connection to a source of voltage, selector means for arranging the heating elements in various circuits of different wattages, and a relatively low voltage thermostatic control circuit adapted to be supplied from said source of voltage for controlling the energization of the heating elements, said control circuit comprising a variable resistance temperature senser for sensing the temperature of the oven air, a pulsing voltage regulator in series with the senser so that the senser varies the effective output voltage of the voltage regulator in accordance with the sensed temperature within the oven cavity, a first responder relay receiving the effective output voltage of the voltage regulator, and an output relay controlled by the first responder relay for controlling the energization of the heating element; the invention comprising a second responder relay for high temperature control, and a set-up relay means controlled by a set-up switch means for energizing the second responder relay while the first responder relay cycles when the oven temperature is above its maximum setting so as to protect itself against overheating, the first responder relay controlling said heating elements for normal cooking operations up to a maximum of about 600° F., while the alternate use of the second responder relay shifts the control point of the control circuit to control said heating elements to attain a heat cleaning temperature between about 750° F. and 950° F.

2. An electric oven as recited in claim 1 wherein the set-up switch means has one position for normal cooking operations and a second momentary contact position for initiating a heat cleaning cycle, the set-up relay means that is energized by the set-up switch means having holding contacts which retain the set-up relay means energized, the second responder relay being opened when the oven temperature reaches a predetermined maximum heat cleaning temperature between the range of 750° F. and 950° F. thereby de-energizing the control circuit and hence the power relay so as to open the power circuit.

3. An electrical thermostatic control system controlling the temperature of a body provided with electric heating means adapted to be connected with a relatively high voltage source of electrical energy so as to hold selected temperatures in such body within a normal range of operations and to establish in said body an elevated temperature materially above said normal range, comprising a power relay connected to control the energization of said heating means from said high voltage source, a relatively low voltage electrical circuit, a variable resistance temperature senser connected to said low voltage circuit, a pulsing thermal voltage regulating relay having an output voltage and connected to said temperature senser to be controlled thereby so that said output voltage is varied in accordance with variations in the voltage supplied by said senser, a first responder relay connected to be operated in accordance with said output voltage of said voltage regulating relay and to control the operation of said power relay to operate said heating means to hold a selected temperature in said body within said normal range, means for adjusting the operation of said first responder relay to vary the temperature in said normal range held within said body; the invention comprising a second responder relay connected to the output of the voltage regulating relay for use in place of the said first responder relay for shifting the point of control of the system from the normal range of temperatures to a materially higher temperature range, a set-up relay in combination with a set-up switch means for connection in the low voltage circuit, the set-up switch having one set of contacts which are closed for energizing the first responder relay for obtaining the normal range of temperatures, the set-up switch also including a set of momentary contacts which are closed for disconnecting the first responder relay and energizing the set-up relay which in turn connects the second responder relay in the circuit and energizes the power relay for operating the heating means until the temperature within said body reaches a predetermined maximum temperature which causes the second responder relay to open thereby de-energizing both the set-up relay and the power relay for completely de-energizing the system.

References Cited in the file of this patent

UNITED STATES PATENTS 2,962,575    Baker _____ Nov. 29, 1960